United States Patent [19]

Huddleston, Jr. et al.

[11] 4,292,424

[45] Sep. 29, 1981

[54] PROCESS FOR RECOVERING VINYL POLYMERS FROM EMULSION POLYMERIZATION LATICES

[75] Inventors: George R. Huddleston, Jr., Lorain; James W. Turner, Bay Village, both of Ohio; Kenneth D. Konter, Washburn, Ill.

[73] Assignee: The B.F. Goodrich Company, Akron, Ohio

[21] Appl. No.: 126,789

[22] Filed: Mar. 3, 1980

[51] Int. Cl.$^3$ ............................. C08F 6/14; C08F 6/16
[52] U.S. Cl. ............................ 528/500; 210/723; 260/29.6 PT; 526/212; 528/502
[58] Field of Search ............ 260/29.6 PT, 29.7 PT; 528/500, 502

[56] References Cited

U.S. PATENT DOCUMENTS

| | | | |
|---|---|---|---|
| 2,844,568 | 7/1958 | Mertz | 528/500 X |
| 3,595,840 | 7/1971 | Moberly | 528/502 X |
| 3,901,842 | 8/1975 | Dembowski | 260/29.6 RW |
| 3,954,910 | 5/1976 | Kropp | 528/501 X |
| 3,956,249 | 5/1976 | Goodman | 528/500 |
| 4,138,539 | 2/1979 | Landolt | 526/93 |
| 4,168,373 | 9/1979 | Nickerson | 528/500 |
| 4,197,399 | 4/1980 | Noël | 528/500 |

*Primary Examiner*—C. A. Henderson
*Attorney, Agent, or Firm*—Roy P. Wymbs

[57] ABSTRACT

The invention relates to the production of vinyl dispersion or paste resins by means of the emulsion polymerization process and the recovery of the resins from the polymer latices produced thereby. In the process, the polymer latex is first carefully coagulated to yield a fast filtering sludge, the sludge is passed to a pressure filter to separate a high solids, friable polymer wetcake from the serum, the wetcake is rinsed with proper agents to neutralize the same and remove undesirable residues, pressure in the filter is applied to the rinsed wetcake to increase the solids content thereof, the wetcake is then broken into particles and friable agglomerates, and thereafter said particles and agglomerates are dried and ground to proper size in one step in a fluid energy mill. Thus the spray drying and the subsequent harsh grinding steps are eliminated producing a superior product for plastisols.

18 Claims, No Drawings

PROCESS FOR RECOVERING VINYL POLYMERS FROM EMULSION POLYMERIZATION LATICES

BACKGROUND OF THE INVENTION

Vinyl plastisol resins are extremely important from a commercial standpoint but they must have a high plasticizer capacity and have increased flexibility, workability and distensibility. Usually, these resins are made by emulsion polymerization processes. In emulsion polymerization of vinyl and vinylidene halides to make polymers and copolymers thereof, relatively large quantities of emulsifier or soap are needed which leads to difficulties in processing the finished dispersion or paste vinyl resins.

In emulsion polymerization, the finished product is a polymer latex which, theoretically, can be coagulated, filtered to remove the polymer particles and then can be dried. However, this is difficult to do without forming agglomerates of polymer which cannot be disintegrated without using harsh grinding procedures which in turn adversely affects the quality of the polymer. If the resin is used as is, the agglomerates are excessively large and detract from the usefulness of the resin when subsequently making vinyl resin plastisols. As a result, it has been the common practice in the industry to take the polymer latex having polymer particles of the proper predetermined size and spray-dry the latex. However, this procedure presents problems, one of which is that when spray-drying, all of the emulsifier or soap, initially added to the polymerization mixture, is deposited on the polymer particles. The large quantity of soap so deposited usually shows up as a cloudiness, or a turbidity, when the resin or polymer is fused with a plasticizers in making a plastisol. Also, the large amount of soap present adversely affects the viscosity of the plastisol in that it produces a higher yield value than that desired. Further, the heat stability of the plastisol is affected by the soap since the same discolors at processing temperatures producing off-colored products.

While many attempts have been made to remove the soap from vinyl dispersion resins by simple washing, most have run into various kinds of technical problems. Also, the various proposals have been expensive and complicated. As a result, little has been done to remove the soap after the spray-drying operation.

Further, and importantly, it is known that spray-drying it is an expensive process with a high expenditure of energy but is has been required for production of high quality fine particle size vinyl dispersion resins. A great deal of work has been done in attempts to develop processes for eliminating the spray-drying step but problems have been encountered and the resulting resins have been of lower or poorer quality than conventional spray dried resins. One method is to use coagulating agents on the vinyl polymer latex to precipitate the polymer and then filter the same by usual methods prior to spray-drying or other means of drying. Most effective coagulation aids or agents have residues that degrade the quality of the polymer or resin. Drying of such materials, after coagulation and filtration, by most conventional methods results in hard lumpy particles and satisfactory grinding by conventional means is difficult and generally results in degradation of the heat stability of the polymer.

It has been proposed in U.S. Pat. No. 3,901,842, issued Aug. 26, 1975, to coagulate the vinyl polymer latex, centrifuge the same to form a polymer wet cake and then redisperse the wet cake by use of a redispersant, such as polyacrylate. Thereafter, the redispersed wet cake is sent to the spray dryer. However, this process still is not the final or desired answer. There is still a great need in the art to produce plastisol vinyl resins having improved properties by an economical process.

SUMMARY OF THE INVENTION

It has been found that vinyl polymer latices can be produced, which have all the necessary and desirable properties to produce excellent plastisols, by employing certain steps in the process downstream from the polymerization reactor. First the dispersion resin latex is collected from the emulsion polymerization zone and passed to a coagulation zone and coagulated by use of carefully selected coagulation aids, to yield a fast filtering sludge with a serum free of resin particles; the sludge is then passed to a pressure filter to separate a high solids, friable vinyl polymer wet cake from the serum; the wet cake so formed is then rinsed with the proper agents in order to neutralize mineral acids and remove undesirable residues and thereafter, pressure in the filter is applied to increase dryness to a desirable solids content and improve friability; the wet cake is then broken into particles that feed readily to the next step wherein said particles are dried and ground to proper size in one step in a fluid energy mill, thus eliminating the spray drying step and producing a finely ground dispersion vinyl polymer idealy suitable for use in plastisols and other applications.

DETAILED DESCRIPTION

Before going into the details of the present invention, it should be pointed out that "vinyl dispersion resin" refers to polymers and copolymers of vinyl and vinylidene halides, such as vinyl chloride, vinylidene chloride, and the like. The vinyl halides and vinylidene halides may be copolymerized with each other or either may be copolymerized with one or more unsaturated polymerizable olefinic monomers. As examples of such unsaturated monomers there may be named $\alpha\text{-}\beta$-olefinically unsaturated carboxylic acids, such as acrylic acid, methacrylic acid, ethacrylic acid, $\alpha$-cyanoacrylic acid, and the like; esters of acrylic acid, such as methyl acrylate, ethylacrylate, butyl acrylate, octyl acrylate, cyanoethyl acrylate, and the like; esters of methacrylic acid, such as methyl methacrylate, butyl methacrylate, and the like; nitriles, such as acrylonitrile and methacrylonitrile; acrylamides, such as methyl acrylamide, N-methylol acrylamide, N-butoxy methacrylamide, and the like; vinyl esters, such as ethyl vinyl ether, chloroethyl vinyl ether, and the like; the vinyl ketones,; styrene and styrene derivatives including vinyl toluene, chlorostyrene, and the like; vinyl naphthalene, allyl and vinyl chloroacetate, vinyl acetate, vinyl pyridine, methyl vinyl ketone, and other polymerizable olefinic monomers of the types known to those skilled in the art. The vinyl dispersion resins are made by the emulsion polymerization of vinyl chloride or vinylidene chloride, either alone or in admixture with one or more olefinic monomers copolymerizable therewith in amounts as great as about 80% by weight based on the weight of the monomer mixture. The most preferred vinyl dispersion resin is polyvinyl chloride (PVC) and the present invention, for simplicity and convenience, will be described in connection therewith, it being understood that this is merely intended in an illustrative sense and not limitative.

In preparing vinyl dispersion resins by the emulsion polymerization technique in an aqueous medium the polymerization recipe will contain a suitable catalyst or a free radical yielding initiator as well as a useful emulsifying agent or emulsifier system. In addition, the polymerization recipe may contain appropriate compounds to adjust the pH thereof to the proper level, for example, such compounds as ammonium hydroxide, sodium hydroxide, and the like. In addition, one may employ buffering agents in the reaction medium, such as trisodium phosphate, tetrasodium pyrophosphate, and the like. In any event, the vinyl polymer latex produced may subsequently be adjusted to any desired pH by suitable means.

Since the polymerization recipe, employed in the emulsion polymerizatin process, affects the process of the instant invention, it is important to note the various components thereof. The free radical yielding catalysts or initiators for making vinyl dispersion resins include, for example, the various peroxygen compounds, such as persulfates, benzoyl peroxide, t-butyl hydroperoxide, t-butyl peroxypivalate, cumene hydroperoxide, t-butyl diperphthalate, perlargonyl peroxide, 1-hydroxycyclohexyl hydroperoxide, and the like; azo compounds, such as azodiisobutyronitrile, dimethylazodiisobutyrate, and the like. Particularly useful initiators are the water-soluble peroxygen compounds, such as hydrogen peroxide, isopropyl peroxydicarbonate, and the like, and the sodium, potassium and ammonium persulfates used by themselves or in an activated redox system. Typical redox systems include alkali metal persulfates in combination with a reducing substance, such as sodium sulfite or sodium bisulfite, a reducing sugar, dimethylamino propionitrile, a diazomercapto compound and a water-soluble ferricyamide compound, or the like. Heavy metal ions may also be used to activate the persulfate catalyzed polymerization. Paricularly useful are alkali metal and ammonium persulfate. The amount of initiator used will generally be in the range between about 0.02% by weight, based on the weight of 100 parts of monomer or monomers being polymerized, and preferably between about 0.05% and about 1.0% by weight.

Insofar as the present invention is concerned, one of the most important components of the polymerization recipe is the emulsifier or emulsifier system. The emulsifier determines to a great extent the particular coagulating agent or agents that will be employed. Further, since the emulsifier is present in the finished polymer latex, it influences the filtering step where it is hoped that it will be removed and returned to the system. The emulsifiers that are generally employed in preparing vinyl dispersion resins are the general types of anionic and nonionic emulsifiers. Useful anionic emulsifiers include alkali metal or ammonium salts of the sulfates of alcohols having from 8 to 18 carbon atoms, such as sodium lauryl sulfate, ethanolamine lauryl sulfate, ethylamine lauryl sulfate, and the like; alkali metal and ammonium salts of sulfonated petroleum and paraffin oils; sodium salts of aromatic sulfonic acids, such as dodecane-1-sulfonic acid and octadiene-1-sulfonic acid; aralkyl sulfonates, such as sodium isopropyl benzene sulfonate, sodium dodecyl benzene sulfonate, sodium isobutyl naphthalene sulfonate, and the like; alkali metal and ammonium salts of sulfonate dicarboxylic acid esters, such as sodium dicetyl sulfosuccinate, disodium-n-octadecyl sulfosuccinate, and the like; alkali metal and ammonium salts of free acid of complex organic mono- and diphosphate esters, and the like. Nonionic emulsifiers, such as octyl- or nonylphenyl polyethoxyethanol, may also be used. Also useful in the present invention are the saturated fatty acids which may be either natural or synthetic, such as, for example, such acids as lauric, myristic, palmitic, marganic, stearic, and the like, beef tallow, coconut oil, and the like. Vinyl polymer latices having excellent stability are obtained when employing the alkali metal and ammonium salts of aromatic sulfonic acids, aralkyl sulfonates and long chain sulfonates. The amount of emulsifier employed may range in amount up to about 6% or more by weight, based on the weight of 100 parts of monomer or monomers being polymerized. Preferably, the amount of emulsifier will be in the range of about 1.0% to about 3.0% by weight.

As is known, the vinyl dispersion resins are employed in making plastisols which in turn are shaped into various useful end products, such as films, molded articles, and the like. In order to obtain certain desirable properties in the plastisols it is often desirable to employ, in addition to the emulsifier, a long straight chain saturated alcohol containing from 8 to 24 carbon atoms in combination with the emulsifier. As examples of such alcohols, there may be named tetradecanol, pentadeconal, hexadecanol, heptadecanol, octadecanol, nonadecanol, eicosanol, heneicosanol, docosanol, tricosanol, tetracosanol, and the like. Mixtures of the alcohols can also be used, for example, a mixture of a 12 carbon alcohol and an 18 carbon alcohol. Also, lower carbon content alcohols can be employed when mixed with the longer chain alcohols. For example, a mixture of dodecanol and octadecanol. When optionally employing an alcohol, a ratio of alcohol to emulsifier of 1.0 can be used. However, the best results are obtained when said ratio is greater than 1.0.

In making vinyl dispersion resins, the emulsion polymerization reaction is usually conducted on the alkaline side, that is, at a pH in the range of about 7.0 to about 12.0. However, there are some resins that are made at a lower pH. Thus there will be used a pH in the range of about 3.0 to about 12.0. The pH is easily adjusted with a base or an acid in the recipe, for example, $NH_4OH$ or $H_2SO_4$, and the like. The amount of the pH adjusting agent will depend in part on the particular emulsifier system being used in the reaction mixture. The polymerization temperature will usually be in the range of about 30° C. to about 70° C. However, for most all vinyl dispersion resins, it is preferred to employ a temperature in the range of about 40° C. to about 55° C.

When the polymerization reaction is complete, the reactor is put under vacuum in order to remove as much of the unreacted monomers as possible and send them to a recovery system. In order to get the unreacted monomer level down within the Governmental limitations, the vinyl polymer latex is pumped into a vacuum tank along with steam wherein the monomer, such as vinyl chloride, is flashed off and sent to the recovery system, since it cannot, under said Governmental regulations, be vented to the atmosphere. This is known as the stripping step and the vacuum tank is referred to as the "stripper."

The novel part of the present invention, which is also somewhat dependent upon the emulsion polymerization procedure employed is comprised of three important steps between the formation of the vinyl polymer latex and subsequent bagging, or otherwise packaging, of the dried polymer or vinyl dispersion resin. The three steps are coagulation, dewatering or filtering, and drying-grinding by means other than spray drying.

In the emulsion polymerization process and stripping, there is needed a polymer latex with a high stability in order to prevent losses of polymer in wall buildup and strainer pluggings. This stability in the latex results from the emulsifier employed. Accordingly, the latices must be destabilized, or one must partially destroy the stabilizing emulsifier in the latices, so that the polymer particles cluster into friable agglomerates and release the liquid serum, which is associated with the particle surfaces in a stable latex. The destabilization of the latices or emulsions is accomplished by means of coagulation in such a manner that will yield a fast filtering sludge with a clear serum and a high solids wet cake, when filtered, which is not sticky.

As pointed out hereinbefore, in the emulsion polymerization process several different types of emulsifiers are used including alkyl sulfates, fatty acid soaps, sulfonates, long straight chain alcohols, etc. Each of these emulsifier systems respond slightly differently to the coagulation procedure or step. For example, lowering the pH of latices that are prepared using fatty acids soaps as emulsifiers results in coagulation. However, the wet cake produced therefrom employing vacuum filtration is generally of a solids content that is too low, that is, below about 60% by weight total solids. The use of a polymeric coagulation aid or agent, such as a polymeric modified polyamine made by Nalco Chemical Company and designated as BX2112 improves the filtering and increases the wet cake solids content. On the other hand, latices stabilized or produced using sodium lauryl sulfate as the emulsifier are not sensitive to pH reduction. These latices can be coagulated by the use of multivalent salts, such as alum or aluminum sulfate and by the polymeric coagulation aids. The most desirable way of coagulating the latex, in accordance with the present invention, is by the addition thereto of a coagulating aid or agent which is added carefully and with suitable agitation.

The function of the coagulating agent is to inactivate the emulsifying agents originally present in the polymerization reaction mixture thus allowing the latex or emulsion to coagulate so that it can be filtered in such a manner as to obtain a substantially clear serum which can be reused in the overall polymer process. In addition to the aluminum sulfate, the coagulation aids suitable for use in the present invention are any of the variation of salts of bivalent or trivalent metals useful in precipitating emulsifiers such as, for example, the chlorides, sulfates, nitrates, and acetates of calcium, magnesium, aluminum, strontium, barium, tin, zinc, and the like. The amount of the coagulating agent employed is important and usually will be in the range of about 0 ppm. to about 50,000 ppm. based on the amount of resin in the latex being treated. Preferably, an amount in the range of about 500 ppm. to about 6000 ppm. is employed. These ranges apply also to the polymeric coagulation aids, such as the polymeric modified polyamine mentioned above. It is to be noted that the lower range of coagulating agent is 0 ppm. This is so because one can coagulate the latex by other means, such as by heating, freezing, excessive shear, and the like.

In addition to the coagulation aids, there is added to the coagulation medium a dilute acid, such as sulfuric acid, hydrochloric acid, and the like, in order to adjust the pH within the range of about 2.0 to about 8.0. This insures the production of friable agglomerates of polymer which are readily filterable. In those instances where the polymerization reaction is conducted at a low pH, a base, such as ammonium hydroxide, sodium hydroxide, etc., is added to adjust the pH in the proper range.

Inasmuch as many of the coagulation aids contain heavy metal ions, it is desirable to remove the same prior to the drying step so that the properties of the vinyl dispersion resins are not adversely affected. These heavy metal ions are removed by adding to the latex, during the coagulation thereof, a chelating agent which complexes the ions which is thereafter filtered off during the filtering step. A very suitable chelating agent is the alkali metal salts of ethylene diamine tetra-acetic acid (EDTA). However, other agents may be employed, such as, for example, alkali metal and ammonium salts of ethylene triamine penta acetic acid, N,N-di ($\beta$-hydroxyethyl) glycine, N-hydroxyethyl ethylenediamine riacetic acid, nitrile triacetic acid, and the like. The amount of the chelating agent necessary will usually be in a slight excess over the stoichiometric amount required for the heavy metal ions present. This amount is readily determinable particularly in view of the fact that the chelating capacity for the various agents are listed in the suppliers manuals. In most all instances it is desirable to add the chelating agent along with the rinse solution during the filtering step, as described hereinafter, especially when coagulation is by means of heavy metal ions.

The next step in the process is the filtering or dewatering step which is most important. It is necessary during the filtering step to remove the serum and obtain a high solids wet cake of polymer. The higher the solids content the better. As solids increase, the cake becomes dry and non-sticky which is imperative prior to the drying step. A wet cake solids content above about 65% is satisfactory for most systems, although in some instances, the wet cakes are dry enough and friable at significantly lower solids content. However, be that as it may, it is preferred to obtain a wet cake solids content in the range of about 65% to about 75% by weight. Such a wet cake is easier to handle in the subsequent drying and fluid grinding operations.

Various different methods of filtering can be employed, such as, for example, vacuum filtration, pressure filtration, and the like, but it has been found that the best results are obtained by using a pressure filtration. The pressure filter not only efficiently removes the serum from the coagulated latex, but allows a positive cake rinse to remove or neutralize residues from the coagulation aids or agents. A suitable pressure filter is one manufactured and sold by Ingersoll-Rand Company and designated as the "Ingersoll-Rand Lasta Automatic Filter Press." In the pressure filter, or Filter Press, the coagulated latex or slurry is pumped into a chamber which is equipped with a filter media. This filter media takes the form of a permeable membrane or cloth through which the liquid portion of the latex, or serum, will pass and be recovered for reuse, if desired, or sent to waste disposal. The filter media may be of any suitable material having the right permeability for the particular polymer latex being filtered or dewatered and have the proper strength to resist the pressures employed. One suitable filter media is a polypropylene cloth having a thickness of approximately 1.3 millimeters. A cloth of this material has a permeability of about 1.0 cubic feet/minute (cfm). Depending upon the pressure of filtration and the size of the polymer particles in the latex or slurry, the permeability should be in the range of about 0.5 cfm. to about 5.0 cfm. Among the materials which are suitable as filter media, there may be named, for example, cotton fabric, membranes made from polyurethane polymers, and the like. It is possible to employ in the present invention filter media which have a permeability as high as 200 to 400 cfm. Choice of the filter media will depend upon the size of the polymer particles. Usually, the pressure employed in filtration or dewatering will be in the range of about 25 psig. to about 300 psig.

The polymer latex or slurry being fed to the filter press, after coagulation, will usually have a total solids content in the range of about 0.5% to about 50% by weight of polymer. After the latex has been filtered or dewatered, it is pressed into the form of a polymer wetcake having a total solids content in the range of about 55% to about 65% by weight of polymer. The wetcake is now ready to be rinsed and compressed to increase dryness and improve friability.

In the emulsion polymerization process the emulsifiers, and other additives employed, leave residues which generally cause adverse effects on polymer color and heat aging unless thay are rinsed away or neutralized. In the coagulated polymer latex there may also be mineral and organic acids which develop as a result of the coagulation step. These likewise must be removed or neutralized. In many instances, rinsing the polymer wetcake with water is sufficient. However, most of the coagulated latices are on the acid side with a pH usually in the range of about 3.0 to about 5.0 thus requiring neutralization. In such instances, the polymer wetcake is rinsed with an aqueous basic solution, such as a dilute ammonium hydroxide solution. Other bases can be employed in dilute solution form for rinsing, such as, for example, the alkali metal hydroxides, etc. It is often desirable to employ a chelating agent in the rinse solution, such as, the sodium or ammonium salts of ethylene diamine tetra-acetic acid (EDTA) for example. The chelating agent complexes the heavy metal ions present, as a result of the coagulation step, and makes them readily removable by the rinsing solution. The basic dilute rinsing solution will usually be in the range of about 0.1% to about 1.0% by weight, and preferably, in the range of about 0.1% to about 0.5% by weight. The rinsing solution is retrieved and sent to a waste disposal system in most cases. However, when a large amount of emulsifier has been employed in the polymerization reaction, it may be economically feasible to send the rinsing solution to a recovery system and then recirculate the recovered emulsifier to the reaction or polymerization zone, making the appropriate adjustments in concentration which is well within the skill of the art.

After the rinsing step and the rinsate has been removed, the polymer filtercake is again put under sufficient pressure to bring the total solids content thereof within the range of about 65% to about 75% by weight or higher if practical. Thereafter, the filtercake is removed from the filter press and sent to a cake breaker granulator, which may be of any of the conventional type granulators available on the market. In the granulator the polymer wetcake is broken up into friable agglomerates of polymer particles making the same ready for the drying and grinding step in the process.

One of the features of the present invention is the avoidance of spray drying which is not only cumbersome but also expensive due to the large expenditure of energy necessary in such a drying procedure. Also, severe grinding of the polymer is necessary in such a process in order to obtain the proper size polymer particles which adversely affects polymer quality with respect to making suitable plastisols therefrom. While various types of drying procedures and apparatus may be used, it has been found that fluid energy mills are the most expedient since they can handle high solids crumbly polymer wetcakes and produce dry finely ground resins or polymers which are comparable to spray dried polymers or resins. A particularly suitable fluid energy mill is one manufactured and sold by Aljet Equipment Company, Willow Grove, Pa. and called a "Pulvajet Mill." This mill is a vertically structured, elongated torus, molded with a hollow interior which is doughnut shaped and functions as a circulating cavity. The mill has two functional areas, namely, a fluid grinding area located at its base and positioned over a high pressure manifold, and a classifying or polymer recovering area located in the upper section of the mill.

The friable agglomerates of polymer particles coming from the cake breaker granulator are fed into the lower section of the fluid energy mill, or the fluid grinding area of said mill. This is a highly turbulent section, or region, of the mill due to the high pressure hot air being injected into the mill by means of hot air jets positioned in the bottom thereof. The temperature of the injected air can be in the range of about 125° C. to about 350° C., depending upon the polymer being dried. Normally, a temperature in the range of about 150° C. to about 250° C. is satisfactory. The outlet air temperature from the fluid energy mill will usually be in the range of about 50° C. to about 70° C. This outlet air temperature works as a good control for maintaining the proper temperature in the mill. The pressure of the hot air injected into the mill may be varied depending upon the turbulence desired and the amount of drying time, since many polymers should not be subjected to high temperatures for prolonged periods of time due to danger of adversely affecting the polymer properties, such as discoloration of the polymer. A hot air pressure in the range of about 2.5 psig. to about 80 psig. is satisfactory. Preferably, the pressure will be in the range of about 5 psig. to about 15 psig.

The injected hot air causes the polymer particles to circle around the dryer cavity. The high turbulence that is created insures extremely good heat transfer. Further, in the fluid grinding area of the mill the high turbulence causes the particles to collide with each other and the friable polymer agglomerates break up into individual polymer particles. In addition, the conversion of water to vapor also caused the friable agglomerates to break apart. The centrifugal force in the dryer cavity throws the larger polymer particles to the outer perimeter and they cycle back for more fluid grinding while the finer polymer particles exit from the mill dryer to collection. The degree of fluid grinding can be controlled by the pressure of the air entering the nozzles and the amount of air is controlled by the size of the nozzles or nozzle openings. For most efficient operation of the fluid energy mill, the air is preheated by direct fired heaters. Since the high temperature air cools quickly as the water in the polymer feed evaporates the dry polymer particles are not subjected to high temperature for any length of time. Further, since the hot air contact time is short, heat degradation of the polymer particles is minimized. The throughput, or capacity, of the fluid energy mill will vary with size but generally, for most commercial polymer operations a capacity in the range of about 500 lbs./hr. to about 30,000 lbs./hr. is satisfactory. Of course, higher or lower throughputs can be employed as desired.

To further illustrate the present invention, the following specific examples are given, it being understood that this merely intended in an illustrative and not a limitative sense. In the examples all parts and percents are by weight unless otherwise indicated.

EXAMPLE I

In making the PVC by the emulsion polymerization procedure, the following recipe was employed:

|  | Parts |
| --- | --- |
| Vinyl Chloride | 100 |
| Demineralized water | 130 |
| Alcohol $C_{12}$–$C_{18}$ | 2.1 |
| Sodium lauryl sulfate | 0.9 |
| Di-(2-ethyl hexyl) peroxydicarbonate | 0.26 |
| Diisononanoyl peroxide | 0.26 |

A monomer premix tank or vessel equipped with an agitator or stirrer was evacuated. Then the premix tank was charged with the water and then, under agitation, with the emulsifier followed by the alcohol and the catalysts, and lastly, the vinyl chloride. The temperature in the premix tank was controlled at about 25° C. by means of a cooling jacket. The mixture was agitated for about 15 minutes and thereafter was passed through a Manton Gaulin 2 stage homogenizer at a temperature of 25° C. into the polymerization reactor which had previously been evacuated. The pressure in the first stage of the homogenizer was 600 psig. and in the second stage was 700 psig. The contents of the reactor were agitated and heated to the reaction temperature of 45° C. and held there throughout the reaction until the desired conversion of approximately 85% was obtained. Thereafter the reactor was cooled, vented and the contents thereof emptied into a stripping tank wherein the unreacted monomer was removed by means of steam passing through the mixture.

After making the emulsion polymerized PVC as described above, 25 gallons of the dispersion resin latex was obtained from the process stream after the monomer stripping step. The latex had a solids content of 30% by weight and the pH was 3.7. The latex was loaded into a stirred coagulation tank at a temperature of 25° C. and coagulated by adding a 2% aqueous solution of aluminum sulfate in such amount as to give an amount equivalent to 5000 ppm. of the anhydrous salt, based on the solids content of the latex. As the coagulation proceeded, the slurry became quite viscous so it was diluted to 20.83% solids with demineralized water to provide a slurry that could be readily and easily handled by the filter feed pump. A portion of the slurry was loaded by pump to a pilot scale pressure filter for 3 minutes at 50 psig. after which 90 psig. pressure was applied, to the cake thus formed, for 30 seconds to set the cake for rinsing. Cake rinsing was then carried out at 80 psig. to force the rinse liquid through the cake at a rate of one gallon per minute (gpm.)

The rinses used consisted of 10 gallons of 0.5% of the diammonium salt of ethylene diamine tetra acetic acid (chelating agent) to remove aluminum ions from the resin or PVC and 5 gallons of demineralized water to remove the residues of the first rinse. The pressure was then increased on the wet cake to 285 psig. for 4 minutes to squeeze additional serum from the cake and thus increase the PVC solids content. All serum discharged through the P264A polypropylene filter medium during loading, rinsing and squeezing was clear and free of particulate matter. The filter press was then opened and 28 pounds of wet PVC cake dropped freely with no fouling of the filter medium. Total solids content of the cake was 66.8% and it was dry to the touch and easily crumbled.

A portion of the wet cake was crumbled and fed to a lab scale fluid energy mill by means of a screw feeder. A hot and cold air mixture at 7 psig. was fed to the fluid grinding section of the mill through ¼ inch nozzles. The hot/cold air ratio was controlled to maintain an exit air temperature from the mill at 55° C. Finely ground dry PVC, as discharged from the mill, was collected by a cyclone and bag. The appearance and texture of the dry PVC was comparable to products obtained from plant production wherein a spray dryer system is employed.

In order to determine the resin properties, plastisols were prepared from the experimental resin of this example and a plant control resin from the spray dryer using the following recipe:

| Dry PVC | 100 parts |
| --- | --- |
| Dioctyl phthalate | 57 parts |
| Epoxidized soya bean oil | 3 parts |
| Stabilizer Synpron 940[1] | 2 parts |

[1]Barium-zinc stabilizer

After thorough mixing of the ingredients in a Hobart mixer, the resulting plastisols were deaerated and tests were run in accordance with standard procedures in the art.

| (1) | Viscosity was measured at 24° C. in the RVF Brookfield Viscometer at 20 rpm. | |
| --- | --- | --- |
| | Control PVC | 10,400 centipoises |
| | Ex. I PVC | 14,500 centipoises |
| (2) | High shear Severs efflux viscosity was measured at 95 psig. through a 0.156 cm. orifice at 24° C. | |
| | Control PVC | 8.82 grams/100 seconds |
| | Ex. I PVC | 11.22 grams/100 seconds |
| (3) | Particle fineness was measured by the North Fineness and Vinyl Dispersion Gauges | |
| | North Fineness | Vinyl Dispersion |
| Control PVC | 4.0 | 50 microns |
| Ex. I PVC | 3.0 | 65 microns |

The above values are in the product specification range thus showing the good quality resin obtained by the process of the present invention without employing the expensive and troublesome spray drying.

The present process has the important advantage of being able to produce high quality dispersion resins or polymers without using costly spray drying. The process has the advantage not only for use with prime material from the plant streams but also for upgrading scrap materials from production to a saleable product. By use of the present process there is a large reduction in energy requirements. The resins or polymers produced herein have improved heat stability and rinsing of the polymer, removing undesirable residues, improves the stability and color of the finished product. The unique one step fluid grinding and drying technique makes it much easier to control the fineness or particle size of the polymers or resins at the desired level. Other advantages of the present invention will be apparent to those skilled in the art.

While the present invention has been described in terms of its specific embodiments, certain modifications and equivalents will be apparent to those skilled in the art and are intended to be included within the scope of the present invention which is to be limited only by the scope of the appended claims.

We claim:

1. A process for producing polymers of vinyl and vinylidene halides and copolymers thereof with each other or either with one or more polymerizable unsaturated olefinic monomers which comprises forming a monomer premix containing an aqueous reaction medium, the monomer or monomers to be polymerized, a free radical yielding catalyst, and at least one emulsifier, homogenizing said premix and passing the same to a reaction zone, polymerizing said premix in said zone at a temperature in the range of about 30° C. to about 70° C. and at a pH of about 3 to about 12 to produce a vinyl polymer latex, passing said latex through a stripping zone to remove unreacted monomer(s) therefrom with steam, passing said stripped latex to a coagulation zone, adding a coagulating agent to said latex in said coagulation zone at a pH in the range of about 2 to about 8 to form a slurry of friable agglomerates of polymer particles in a serum, passing said slurry to a pressure filter zone wherein the serum is removed under pressure through a permeable membrane and a wetcake of polymer is formed, rinsing said wetcake to remove residual compounds therefrom, pressing said wetcake to a solids content in the range of about 65% to about 75% by weight, passing said wetcake to a crumbling zone and breaking the same to form friable polymer agglomerates and particles, passing said polymer agglomerates and particles into a fluid energy mill while injecting heated air into said mill under a pressure in the range of about 2.5 psig. to about 80 psig. thereby grinding and drying said polymer agglomerates and particles, and recovering the polymer from said mill in the form of discrete particles thereof.

2. The process as defined in claim 1 wherein the monomer is vinyl chloride.

3. The process as defined in claim 1 wherein the total solids content of the stripped latex is in the range of about 5% to about 50% by weight.

4. A process as defined in claim 1 where the amount of coagulating agent is in the range of about 0 ppm. to about 50,000 ppm. based on the amount of resin being treated.

5. A process as defined in claim 1 wherein the temperature of the air in the fluid energy mill is in the range of about 50° C. to about 80° C.

6. A process as defined in claim 1 wherein the coagulating agent is calcium chloride.

7. The process as defined in claim 1 wherein the coagulating agent is aluminum sulfate.

8. The process as defined in claim 1 wherein the coagulating agent is a polymeric modified polyamine.

9. A process as defined in claim 1 wherein the rinsing is done with an aqueous solution of ammonium hydroxide or alkali metal hydroxide.

10. A process as defined in claim 1 wherein the rinsing solution contains a chelating agent.

11. A process as defined in claim 1 wherein the chelating agent is selected from the sodium salts and ammonium salts of ethylene diamine tetra-acetic acid.

12. A process as defined in claim 3 wherein the amount of the coagulating agent is in the range of about 0 ppm. to about 50,000 ppm. based on the amount of resin being treated.

13. A process as defined in claim 12 wherein the coagulating agent is aluminum sulfate.

14. A process as defined in claim 13 wherein the rinsing is done with an aqueous solution of ammonium hydroxide.

15. A process as defined in claim 14 wherein the rinsing solution contains a chelating agent.

16. A process as defined in claim 15 wherein the temperature of the air in the drying zone is in the range of about 50° C. to about 80° C.

17. A process as defined in claim 15 wherein the chelating agent is the sodium salt of ethylene diamine tetra-acetic acid.

18. A process as defined in claim 13 wherein the rinsing is done with an aqueous solution of an alkali metal hydroxide.

* * * * *